(No Model.)
J. H. DOLMAN.
PROTRACTOR.
No. 430,005. Patented June 10, 1890.
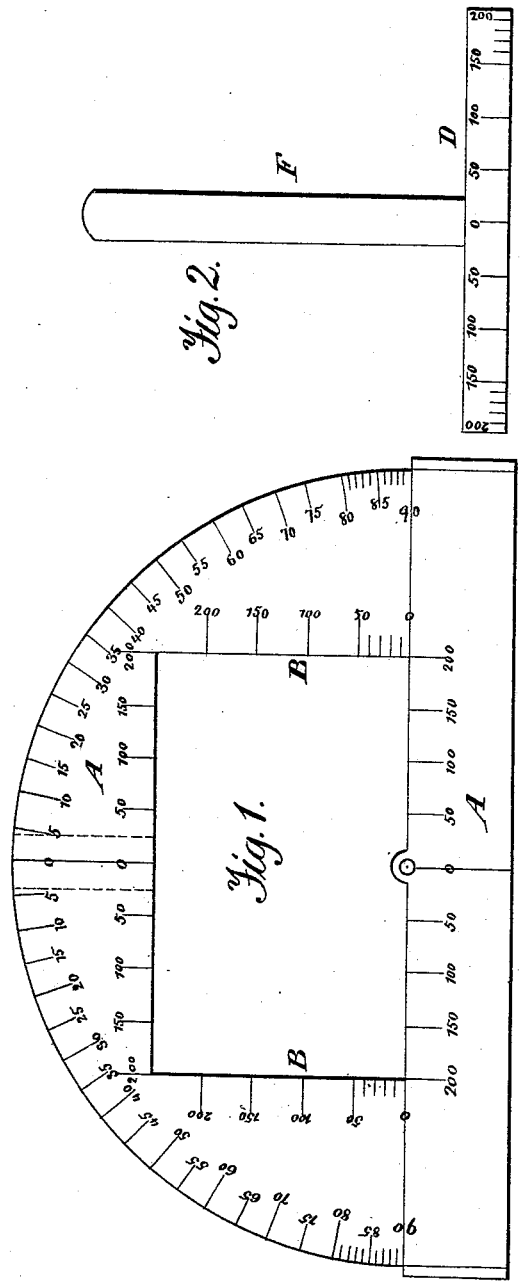
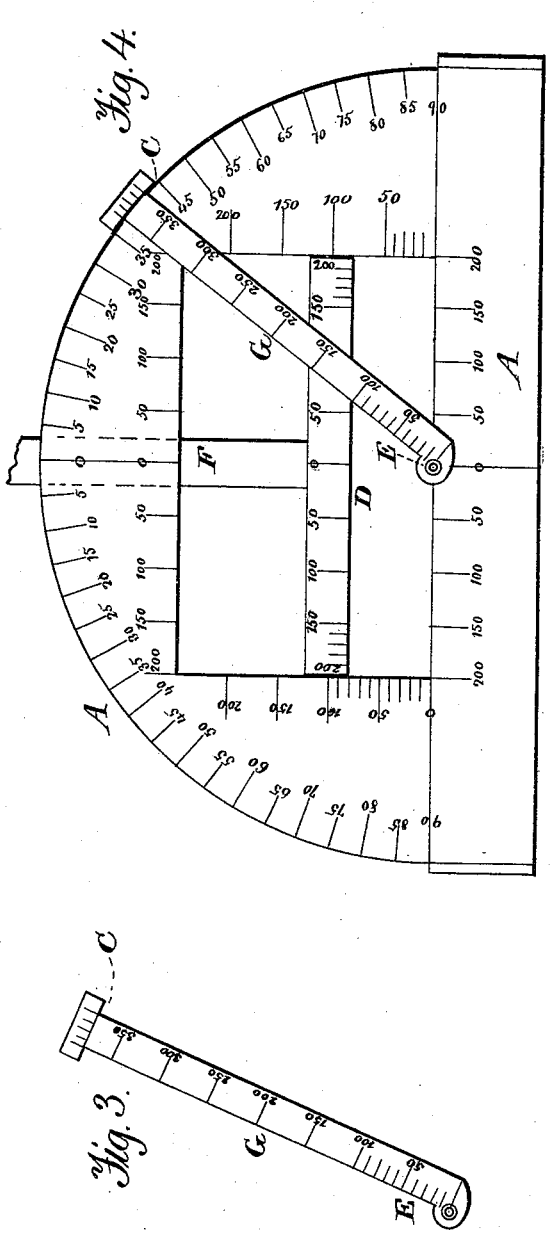
Witnesses.
A. Ruppert
H. A. Daniels
Inventor.
John H. Dolman,
Per
Thomas P. Simpson,
atty.

UNITED STATES PATENT OFFICE.

JOHN H. DOLMAN, OF RAYNOR, TEXAS.

PROTRACTOR.

SPECIFICATION forming part of Letters Patent No. 430,005, dated June 10, 1890.

Application filed September 14, 1889. Serial No. 323,935. (No model.)

*To all whom it may concern:*

Be it known that I, JOHN H. DOLMAN, a citizen of the United States, residing at Raynor, in the county of Stonewall and State of Texas, have invented certain new and useful Improvements in Protractors or Plotters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a protractor or plotter by which may be calculated the length of the base, perpendicular, and hypotenuse of a right-angled triangle when the latitude and departure or the altitude and depression are given.

Figure 1 of the drawings is a plan view of the main protractor-plate; Fig. 2, a detail in elevation of the departure-scale with its handle; Fig. 3, a detail view of the pivoted bearing-scale; and Fig. 4, a view of all the parts in conjunction, as when in practical use.

In the drawings, A represents a protractor or plotter of semicircular form, and notated in degrees from 0 to 90 on each side of a bisecting-point on the arc, and B is a rectangular scale formed on the same plate within the semicircle and on its diameter as a base, numbered from 0 to 200.

D is a movable latitude scale-bar from which to read departures, the same being provided with a handle F to draw it for adjusting purposes. On the zero-pivot E turns the arm G, from which the bearings are obtained.

The protractor A is numbered, so as to give bearings in degrees, and the scale B is graduated so as to give parallels, while the pivot E represents the station and true meridian north and south.

The rectangular scale represents the latitude and departure or latitude and depression, the figures on the face being intended to give parallel points for the purpose of changing bearings.

G represents the bearing-line, and is divided into one-hundredths of an inch, and numbered from 0 to 350, carrying a vernier, if desired.

D represents the latitude and depression bar, which is movable, reads right and left from center, and should have spaces cut on edge, as on the rectangular scale B. This bar D should be adjusted with the meridian-line when put on the plate of scales A B, reading east and west.

E represents a pivot to hold the bearing, and must have a central hole to see how to adjust the scale-measure over station-point.

The handle F is fast to the departure-bar, and should pass through a groove on the under side of the scale-plate, as shown in dotted lines in Fig. 1.

For north bearings place the pivot-hole E over station and the top of scale-plate, so that north will be in front of the operator, to indicate the north pole or north end of the meridian-line. Then if the bearing be north and east turn the bearing-arm C to the right or east, and the proper number of degrees on the arc corresponding with the bearing. Next adjust the departure bar or scale D, so as to cut the number on the bearing-arm C, which corresponds with the measure of distance between stations, and this will be the first line, while to the left will be north and west bearings, and the number so cut on the meridian-bar will be departure and the numbers between departure-bar and pivot-line will be latitude, if the inner edge of the bar reads the same at both ends.

The signs of plus and minus must be changed when latitude changes to departure, or the reverse.

To change bearings, note the departure of the last bearing and make a point at the corresponding number, with the last departure at the top and bottom of rectangular scale for a new line. Place the latitude-line on the plate with the top or north end to the east, and continue in the same way until the plat is complete.

In order to calculate distance or read greater distances than those marked on the bearing-arm, division and multiplication must be employed—as, for instance, dividing all the sides of a triangle with the same number, or multiplying, as thereby their ratios will not be changed.

What I claim as new, and desire to protect by Letters Patent, is—

The combination, with the semicircular protractor provided with a rectangular opening the edges of which are graduated, and centrally-pivoted vernier, of the departure-scale D, arranged to move up or down within the said rectangular scale within the semicircular scale, substantially as shown and described.

In testimony whereof I affix my signature in presence of two witnesses.

JOHN H. DOLMAN.

Witnesses:
I. H. CARMICHAEL,
J. W. KELLEY.